US012801061B2

(12) United States Patent
Matsumoto

(10) Patent No.: US 12,801,061 B2
(45) Date of Patent: Nov. 17, 2026

(54) IMAGE FORMING DEVICE AND CONTROL METHOD THEREFOR

(71) Applicant: SHARP KABUSHIKI KAISHA, Sakai City (JP)

(72) Inventor: Kazutaka Matsumoto, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 169 days.

(21) Appl. No.: 18/779,765

(22) Filed: Jul. 22, 2024

(65) Prior Publication Data

US 2025/0036040 A1 Jan. 30, 2025

(30) Foreign Application Priority Data

Jul. 26, 2023 (JP) ................................ 2023-121976

(51) Int. Cl.
*G03G 15/043* (2006.01)
*G03G 15/04* (2006.01)

(52) U.S. Cl.
CPC ... *G03G 15/0435* (2013.01); *G03G 15/04072* (2013.01); *G03G 2215/0404* (2013.01)

(58) Field of Classification Search
None
See application file for complete search history.

(56) References Cited

U.S. PATENT DOCUMENTS 5,774,158 A * 6/1998 Desie ..................... B41J 2/4155 347/124
2007/0206227 A1* 9/2007 Inoue ..................... H04N 1/486 358/3.2
2010/0124426 A1 5/2010 Sekine
2010/0196029 A1* 8/2010 Inagaki ............ G03G 15/04054 399/51
2010/0196052 A1 8/2010 Suhara
2013/0258412 A1* 10/2013 Otsuka ..................... H04N 1/00 358/3.01
2014/0146367 A1* 5/2014 Kodama ............ G06K 15/1881 358/3.06
2014/0368885 A1* 12/2014 Ido ....................... G06K 15/188 358/3.1
2016/0266512 A1* 9/2016 Haruta ................. G03G 15/043
2017/0075272 A1* 3/2017 Kimura .............. G03G 15/5025
2018/0239283 A1* 8/2018 Nimura .................. G03G 15/55
2020/0073276 A1* 3/2020 Shindo ............. G03G 15/04018
2023/0314996 A1* 10/2023 Suzuki ............... G03G 15/0266 399/49

FOREIGN PATENT DOCUMENTS

JP 2010-115904 A 5/2010
JP 2010-176094 A 8/2010

* cited by examiner

*Primary Examiner* — Sevan A Aydin
(74) *Attorney, Agent, or Firm* — ScienBiziP, P.C.

(57) ABSTRACT

An image forming device employing an electrophotographic method that scans a surface of an image carrier with a multi-beam emitted from a plurality of light-emitting elements based on image data, including: a light quantity corrector that performs a light quantity correction so as to resolve a density level difference in an image, and sets a difference in a light quantity correction value of the plurality of light-emitting elements; and a controller that, when the image data is in a predetermined image mode such as text/CAD, controls the light quantity corrector so as to not set a difference in a set light quantity of the plurality of light-emitting elements.

4 Claims, 10 Drawing Sheets

◯ RECIPROCITY FAILURE IMAGE

◆WHEN THERE IS NO DIFFERENCE IN LD SET LIGHT QUANTITY

◆WHEN THERE IS A DIFFERENCE IN LD SET LIGHT QUANTITY

FIG. 10A

[CONVENTIONAL SETTINGS]

| LD NUMBER | LIGHT QUANTITY CORRECTION AMOUNT | TWO LINE TOTAL CHANGE IN LIGHT QUANTITY |
|---|---|---|
| LD1 | -6 | -2 |
| LD2 | 4 | 2 |
| LD3 | -2 | -2 |
| LD4 | 0 | 0 |
| LD5 | 0 | -2 |
| LD6 | -2 | 2 |
| LD7 | 4 | -2 |
| LD8 | -6 | |

FIG. 10B

[SETTINGS IN EMBODIMENT]

| LD NUMBER | LIGHT QUANTITY CORRECTION AMOUNT | TWO LINE TOTAL CHANGE IN LIGHT QUANTITY |
|---|---|---|
| LD1 | 0.00 | -1.72 |
| LD2 | -1.71 | 1.72 |
| LD3 | 3.43 | -1.72 |
| LD4 | -5.14 | 1.72 |
| LD5 | 6.86 | -1.72 |
| LD6 | -8.57 | 1.72 |
| LD7 | 10.29 | -1.72 |
| LD8 | -12 | |

IMAGE FORMING DEVICE AND CONTROL METHOD THEREFOR

CROSS-REFERENCE TO RELATED APPLICATION

The present application claims priority from Japanese Application JP2023-121976, the content to which is hereby incorporated by reference into this application.

BACKGROUND OF THE INVENTION

1. Field of the Invention

The present disclosure relates to an image forming device and the like.

2. Description of the Related Art

An electrophotographic image forming device is known in which a light beam emitted from a light source, such as a laser diode, is focused on a photoreceptor drum (image carrier) by a scanning optical system to form an electrostatic latent image on the surface of the photoreceptor drum.

In this type of image forming device, a reciprocity failure phenomenon occurs in which, even when the total light quantity that is applied to the photoreceptor drum is the same, the formation state of the latent image differs when there is a difference in the relationship between the light quantity and the light exposure time. That is, when the light exposure is for a very short period of time, compared to a case where the light exposure is over a relatively long period of time, a reciprocity failure occurs in which the amount of change in the potential of the photoreceptor is reduced despite the total light exposure quantity being the same. In the case of a multi-beam scanning optical system, a reciprocity failure appears as unevenness in the image density.

Conventionally, in order to deal with unevenness in the image density caused by such a reciprocity failure, a method has been disclosed where a vertical cavity surface emitting laser (VCSEL), in which a large number of light-emitting points are arranged in a main scanning direction and a sub-scanning direction, is used as a light source, and multiple light exposures are performed at a certain scanning frequency or more to make the density level difference unnoticeable. However, in this technique, the number of beams is large, such as 32 beams, and the driving system becomes complicated. Furthermore, there are also problems such as the cost being significantly increased.

Another method is known in which density level differences in a half-tone image are prevented from occurring by inverting the sign of a correction value of an exposure light quantity such that the correction value gradually becomes smaller toward a light source positioned at the center a plurality of light sources. Such a configuration can be easily implemented, but when an image is in a predetermined image mode having edges, such as text/CAD, the jaggies become worse and the performance at a specified resolution could not be sufficiently exhibited.

SUMMARY OF THE INVENTION

The present disclosure has been made in consideration of the circumstances described above, and provides an image forming device and the like that can prevent a worsening of jaggies in a predetermined image mode such as text/CAD, and can sufficiently exhibit the performance at a specified resolution.

The present disclosure is an image forming device employing an electrophotographic method that scans a surface of an image carrier with a multi-beam emitted from a plurality of light-emitting elements based on image data, comprising: a light quantity corrector that performs a light quantity correction so as to resolve a density level difference in an image, and sets a difference in a light quantity correction value of the plurality of light-emitting elements; and a controller that, when the image data is in a predetermined image mode such as text/CAD, controls the light quantity corrector so as to not set a difference in a set light quantity of the plurality of light-emitting elements.

The present disclosure is an image forming device employing an electrophotographic method that scans a surface of an image carrier with a multi-beam emitted from a plurality of light-emitting elements based on image data, comprising: a light quantity corrector that performs a light quantity correction so as to resolve a density level difference in an image, and sets a difference in a light quantity correction value of the plurality of light-emitting elements; and a controller that controls the light quantity correction value of the plurality of light-emitting elements such that a sign is inverted while a value of a correction value of each light-emitting element is made smaller from a light-emitting element on one end side toward an other end side.

The present disclosure is a control method of an image forming device employing an electrophotographic method that scans a surface of an image carrier with a multi-beam emitted from a plurality of light-emitting elements based on image data, the method comprising: performing a light quantity correction so as to resolve a density level difference in an image, and setting a difference in a light quantity correction value of the plurality of light-emitting elements; and controlling, when the image data is in a predetermined image mode such as text/CAD, the light quantity correction so as to not set a difference in a set light quantity of the plurality of light-emitting elements.

According to the image forming device and the like of the present disclosure, it is possible prevent a worsening of jaggies of an image in a predetermined image mode such as text/CAD, and the performance at a specified resolution can be sufficiently exhibited. Furthermore, because a difference is set in the light quantity correction value of the plurality of light sources in a half-tone image in a mode other than the predetermined image mode such as text/CAD, even if an electronic bow correction is performed, superior effects are achieved such as density level differences not occurring in the half-tone image due to the influence of a reciprocity failure.

BRIEF DESCRIPTION OF THE DRAWINGS

FIG. 10A is an explanatory diagram of light quantity correction value settings, and is a setting method of the light quantity correction values of a comparative example.

FIG. 10B is an explanatory diagram of light quantity correction value settings, and is a setting method of the light quantity correction values according to the present embodiment.

DETAILED DESCRIPTION OF THE INVENTION

An embodiment of the present disclosure will be described below with reference to the accompanying drawings.

Note that the following embodiment is an example for describing the present disclosure, and the technical scope of the disclosure described in the claims is not limited to the following description.

1. Embodiment

Figure 1:
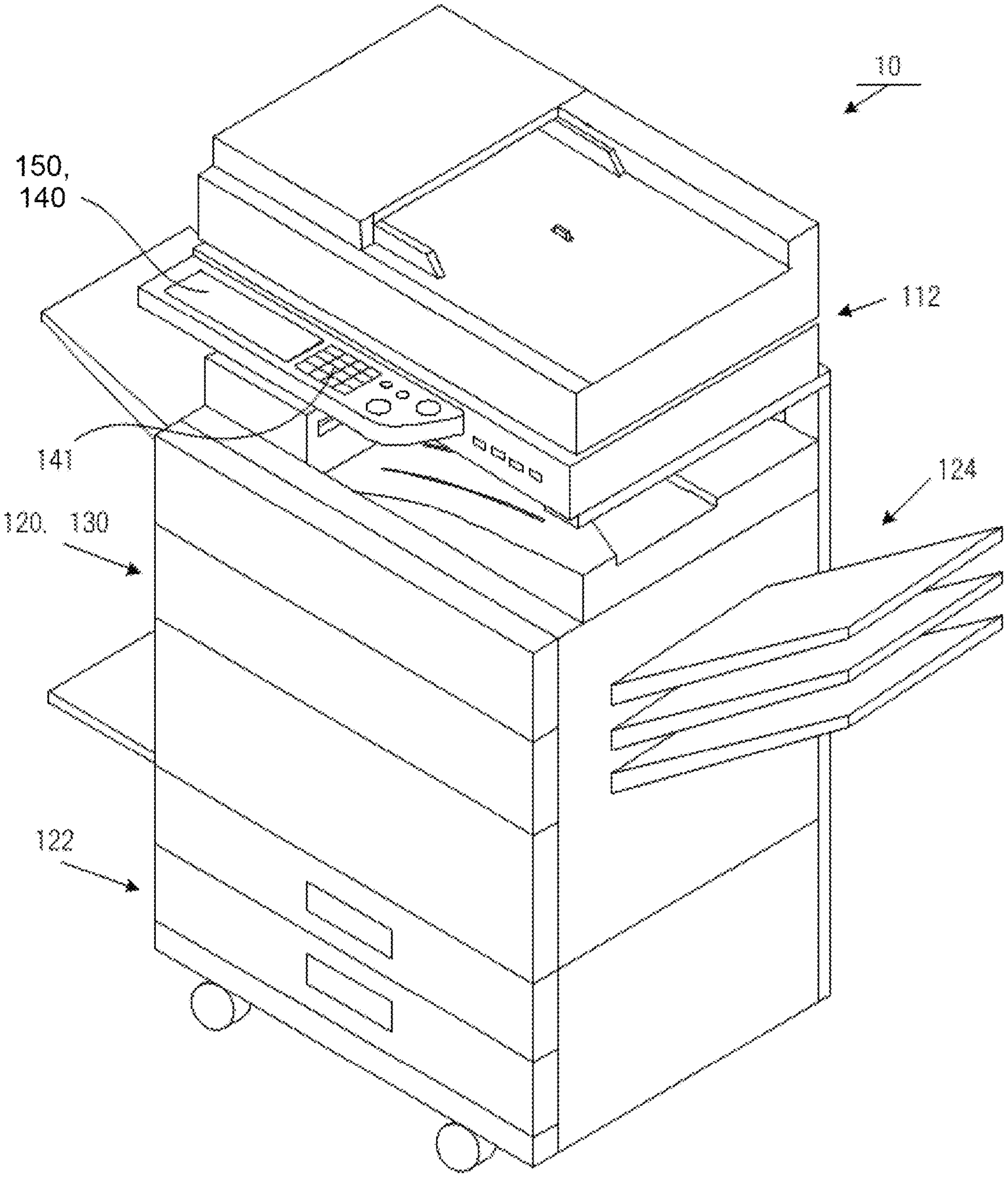
FIG. 1 is an external view of an image forming device according to an embodiment to which an optical scanning device has been installed.
Figure 2:
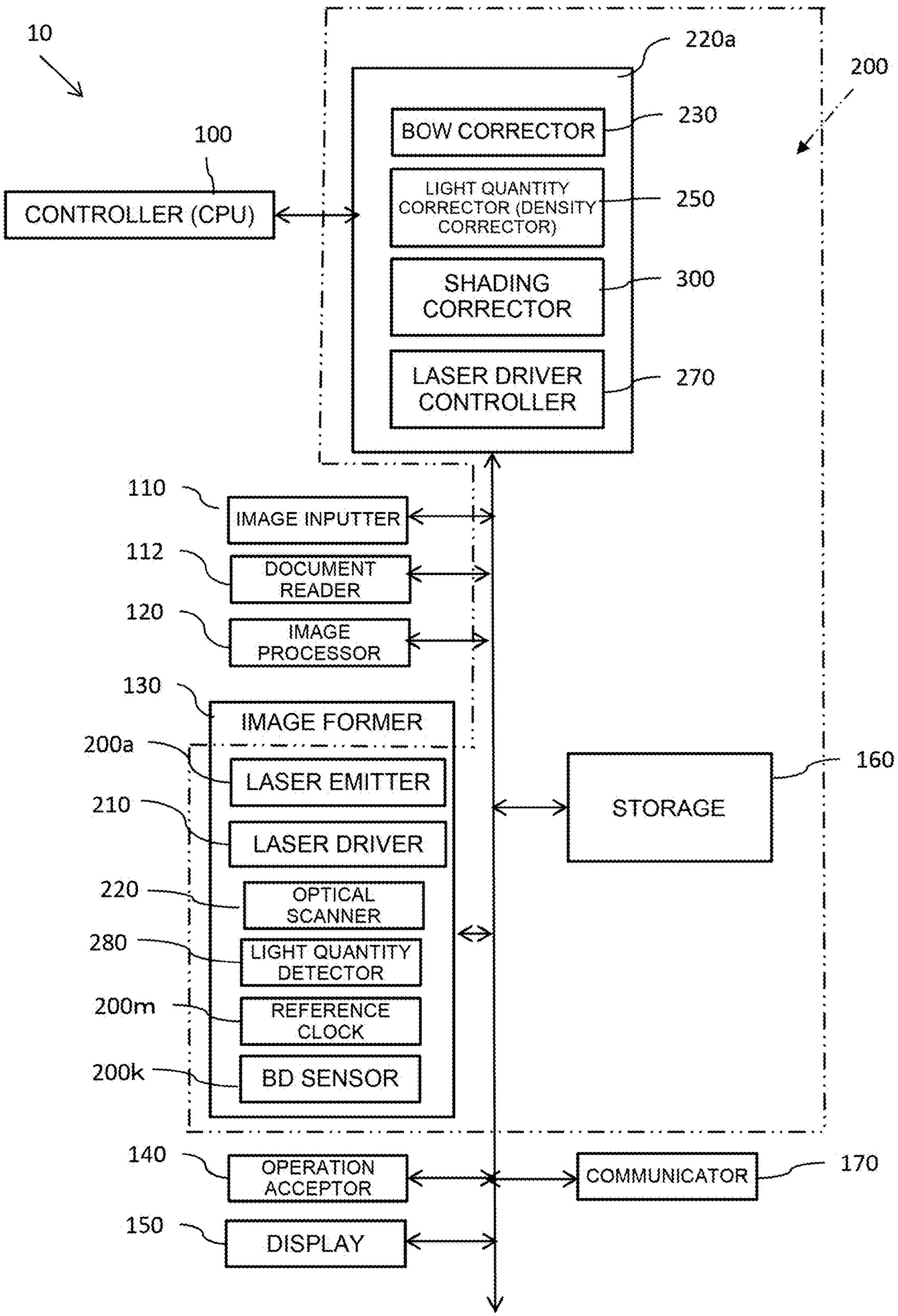
FIG. 2 is a control block diagram of the image forming device and the optical scanning device.

First, a configuration of an image forming device 10 according to an embodiment will be described. FIG. 1 is an external view of the image forming device 10 according to the embodiment to which an optical scanning device 200 has been installed. FIG. 2 is a control block diagram of the image forming device 10 and the optical scanning device 200.

1.1. Overall Configuration

As illustrated in FIG. 1, the image forming device 10 is an information processing device that includes a document reader 112 at an upper portion of the image forming device 10 that reads an image of a document and outputs the image by using an electrophotographic method. The image forming device 10 may be, for example, a multifunction printer.

As illustrated in the control system diagram in FIG. 2, the image forming device 10 mainly includes at least one controller 100, an image inputter 110, the document reader 112, at least one image processor 120, an image former 130, an operation acceptor 140, a display 150, at least one storage 160, and at least one communicator 170, and also includes the functions of the optical scanning device 200.

1.2 Image Forming Device 10

As illustrated in FIG. 2, the controller 100 is a functional unit for controlling the entire image forming device 10.

Further, the controller 100 realizes various functions by reading and executing various programs, and is configured by, for example, one or more arithmetic devices (such as a central processing unit (CPU)) or the like.

The image inputter 110 is a functional unit for reading image data that is input to the image forming device 10. Further, the image inputter 110 is connected to the document reader 112, which is a functional unit that reads an image of a document, and inputs the image data that is output from the document reader 112.

Moreover, the image inputter 110 may receive image data from a storage medium such as a USB memory or an SD card. Also, the image inputter 110 may receive image data from an other terminal device via the communicator 170, which connects to other terminal devices.

The document reader 112 has a function of optically reading a document placed on a contact glass (not shown), and passing the scan data to the image processor 120.

The image former 130 is a functional unit for forming output data based on the image data on a recording medium (such as recording paper). For example, as illustrated in FIG. 1, the recording paper is fed from a paper feed tray 122, and after an image is formed on the surface of the recording paper in the image former 130, the recording paper is ejected to a paper discharge tray 124. The image former 130 is configured by a laser printer that uses an electrophotography process employing an electrophotographic method.

In the electrophotographic process of the image former 130, the optical scanning device 200 described below forms an electrostatic latent image by scanning a laser beam (which corresponds to laser light) corresponding to the image data on the surface of a photoreceptor drum (image carrier) (not illustrated) by using a light scanner 220 having a polygon mirror or the like, develops the electrostatic latent image with toner, and transfers and fixes the developed toner image onto a recording medium, thereby forming an image.

The image processor 120 has the function of performing a conversion to a set file format (such as TIFF, GIF, or JPEG) based on the image data read by the document reader 112. Then, the image processor 120 forms an output image based on the image data subjected to the image processing.

The operation acceptor 140 is a functional unit for accepting an operation instruction from a user, and is configured by various key switches, devices that detect input by contact, and the like. The user inputs the functions and output conditions to be used via the operation acceptor 140.

The display 150 is a functional unit for displaying various types of information to the user, and is configured, for example, by a liquid crystal display (LCD).

That is, the operation acceptor 140 provides a user interface for operating the image forming device 10. The display 150 displays various setting menu screens of the image forming device, and messages.

As shown in FIG. 1, the image forming device 10 may include, as the configuration of the operation acceptor 140, a touch panel in which an operation panel 141 and the display 150 are integrally formed. In this case, the method of detecting inputs on the touch panel may be a general detection method, such as a resistive film method, an infrared method, an electromagnetic induction method, or an electrostatic capacitive method.

The storage 160 is a functional unit that stores various programs including a control program necessary for the operation of the image forming device 10, various data including the read data, and user information. The storage 160 includes, for example, one or more non-volatile ROMs (Read Only Memory), a one or more RAMs (Random Access Memory), one or more HDDs (Hard Disk Drive), and the like. Furthermore, the storage 160 may also include one or more SSDs (Solid State Drive), which is a semiconductor memory.

The communicator 170 communicatively connects with an external device. One or more communication interfaces (communication I/F) used to send and receive data are provided as the communicator 170. As a result of the communication I/F, a user operation made with respect to the image forming device 10 allows the data stored in the storage of the image forming device 10 to be sent and received by an other computer device connected via a network.

1.3 Optical Scanning Device 200

As illustrated in FIG. 2, the optical scanning device 200 is installed in the image forming device 10.

Figure 3:
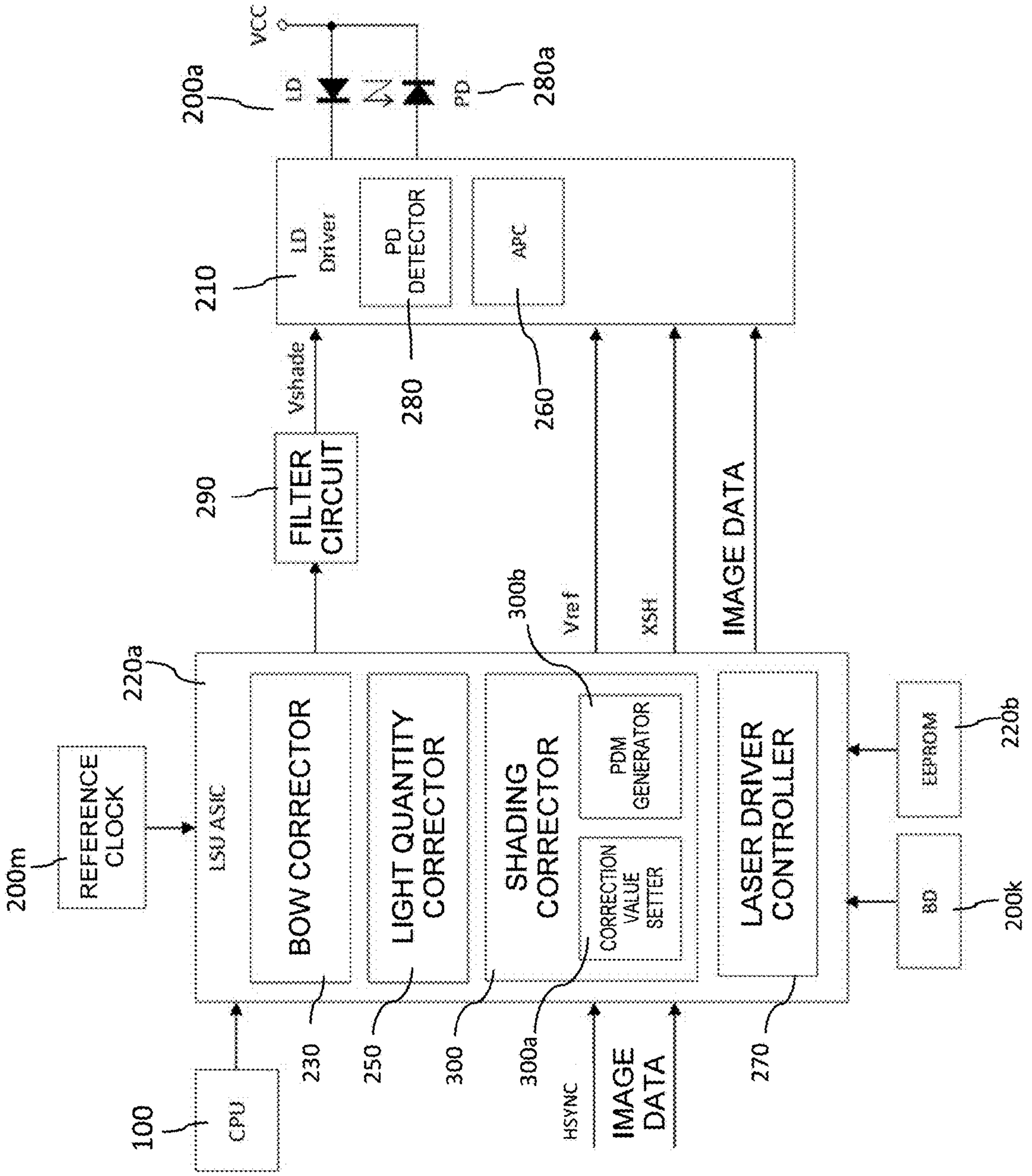
FIG. 3 is a circuit diagram of a signal transmission path from a laser emitter to a laser driver of the optical scanning device.

Furthermore, FIG. 3 is an explanatory diagram illustrating a signal transmission path from a laser scanning unit 220*a*, which electronically processes a laser light, to a laser driver 210 of the optical scanning device 200.

As illustrated in FIGS. 2 and 3, the optical scanning device 200 includes: a laser emitter 200*a* provided with a plurality of laser-emitting elements (semiconductor laser elements (LD: laser device)), and that emits a plurality of beams of laser light (which corresponds to a "multi-beam"); the laser driver 210 that controls the laser emitter 200*a*; the laser scanning unit 220*a* that scans the multi-beam emitted from the laser emitter 200*a* on a photoreceptor drum (not illustrated) based on the image data; a bow corrector 230 that performs an electronic bow correction of the image data; a light quantity corrector (density corrector) 250 that performs a light quantity correction so as to resolve a density level difference in an image, and also sets a difference in the light quantity correction value of the plurality of laser-emitting elements; the controller 100 that controls the light quantity corrector 250, which does not set a difference in the light quantity correction value of the plurality of light-emitting elements when an image is in a predetermined image mode having edges, such as text/CAD (Computer Aided Design), and sets a light quantity correction value difference in a half-tone image mode other than the predetermined image mode; a shading corrector 300 that performs shading correction processing on an image; and a laser driver controller 270 that transmits a control signal to the laser driver 210 based on data that has been subjected to bow correction and a control signal of the light quantity correction, and controls the light emission of the plurality of laser-emitting elements provided in the laser emitter (LD) 200*a*.

As shown in FIG. 3, the multi-beam that is emitted by the plurality of laser-emitting elements of the laser emitter 200*a* is received at each of a plurality of photodiodes (PD) 280*a*. The output signals of the photodiodes 280*a* are input to a light quantity detector (PD detector) 280 provided in the laser driver 210. The light quantity detector 280 detects the light emission quantity of each laser-emitting element based on the output signals.

The laser driver 210 includes an APC unit 260 that performs automatic power control (APC) to control the output of the laser-emitting elements to a constant value based on the light emission quantity of each laser-emitting element (laser emitter 200*a*) detected by the light quantity detector 280.

The laser driver 210 takes, as inputs, a Vshade signal (via a filter circuit 290), a Vref signal, an XSH signal, and an image signal that are output by the laser scanning unit (LSU) 220*a*, and controls the light emission quantity of the laser-emitting elements (laser emitter 200*a*).

A reference clock signal generator 200*m* generates a reference clock signal for the control, and a beam detection (BD) sensor 200*k* is provided on a starting end side of a scanning region of the light beam, and controls the timing at which the electrostatic latent image is written on the photoreceptor drum. Note that, in FIG. 3, Vcc represents the power supply voltage.

As illustrated in FIG. 3, the bow corrector 230, the light quantity corrector (density corrector) 250, the shading corrector 300, and the laser driver controller 270 are realized when the laser scanning unit 220*a* having an electronic control configuration that is installed to the optical scanning device 200 is controlled based on an instruction signal issued by the controller 100. The details of each unit will be described later. Specifically, the laser scanning unit 220*a* is configured as an application specific integrated circuit (ASIC).

1.4 Details of Control

In the present embodiment, the laser light quantity that is output according to a reference voltage (Vref) in the sub-scanning direction is set so as to differ for each beam.

The Vshade signal, the Vref signal, the XSH signal, and the image signal are input to the laser driver 210.

The Vshade signal is an analog voltage for the shading of the laser scanning unit 220*a*. In the shading corrector 300 of the laser scanning unit 220*a* (LSU ASIC), a correction value setter 300*a* sets a shading correction value obtained in advance through an experiment or the like, and a PDM wave output via a PDM generator 300*b* is converted into the Vshade signal, which is an analog voltage, by the external filter circuit 290. The Vshade signal is input from the filter circuit 290 to the laser driver 210. Note that the shading correction value is obtained in advance through an experiment or the like, and may be stored in the ROM or the like of the storage 160 of the image forming device in addition to the storage 220*b*.

The Vref signal is a sub-scanning reference voltage. The light quantity is proportional to the Vref voltage, which is a reference voltage of the APC. As a result of adjusting the gain of the light quantity detector (PD detector) 280 in the laser driver 210, even if there are variations in the current flowing through the photodiodes 280*a* or the lens transmittance, a constant light quantity corresponding to Vref is output to the image surface.

In the present embodiment, the gain of the light quantity detector (PD detector) 280 is adjusted such that the light quantity that is output to the image surface according to Vref differs for each beam of the multi-beam of the emitter 200*a*.

The XSH signal is a control signal of the APC signal, and when the XSH signal is valid (low), the APC unit 260 executes APC.

Figure 4:
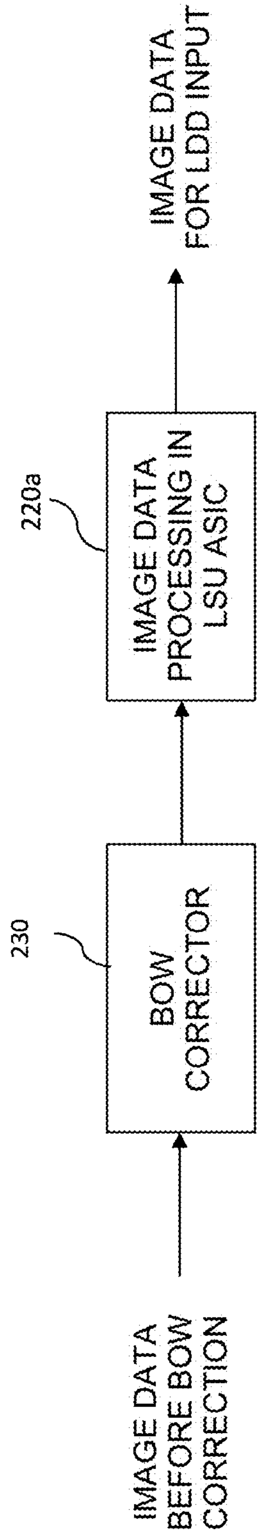
FIG. 4 is a diagram schematically illustrating the signal processing and signal flow in the optical scanning device.

FIG. 4 is a diagram schematically illustrating the signal processing and signal flow in the optical scanning device 200 illustrated in FIG. 3.

As illustrated in FIG. 4, the image data before bow correction is subjected to bow correction processing by a bow corrector 230, and the image after bow correction is subjected to the required processing by the laser scanning unit 220*a* and input to the laser driver (LDD) 210.

FIGS. 5A to 5E are a diagram describing an electronic bow correction performed by the bow corrector 230. As illustrated in FIGS. 5A to 5E, an electronic bow correction is a process of suppressing a color shift by shifting image data in a sub-scanning direction in segment units so as to cancel out a curvature component that is different for each color.

Figure 5A:
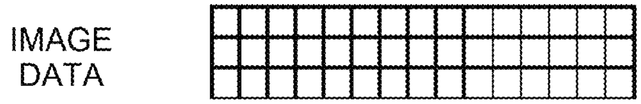
FIGS. 5A to 5E are an explanatory diagram of an electronic bow correction.
Figure 5B:
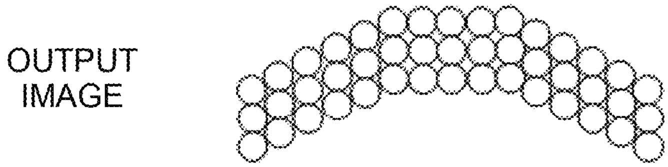
Figure 5C:
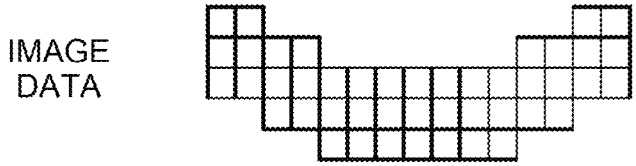
Figure 5D:
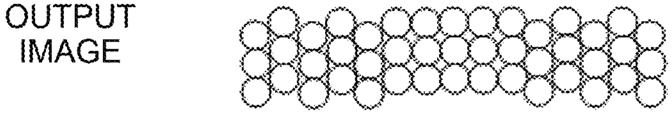
Figure 5E:
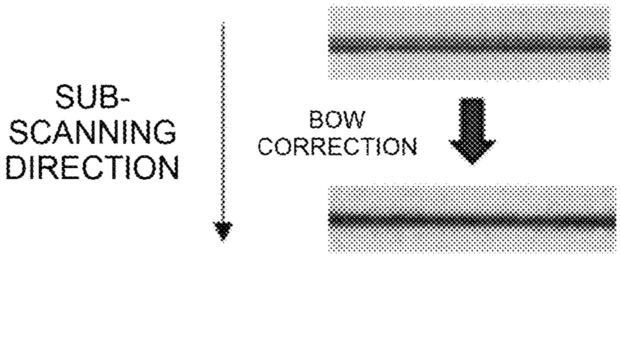

Specifically, even when the input image data does not have a curvature in the sub-scanning direction as illustrated in FIG. 5A, the output image may have a bow-shaped curvature in the sub-scanning direction as illustrated in FIG. 5B due to the influence of a state of the actual optical system or the like. Therefore, as illustrated in FIG. 5C, the image data is subjected to a bow correction that bends the image data in the opposite direction, and as illustrated in FIG. 5D, the bow correction is performed with respect to the image such that the output image becomes straight. FIG. 5E is a diagram illustrating an example of the output image before and after the bow correction.

Figure 6B:
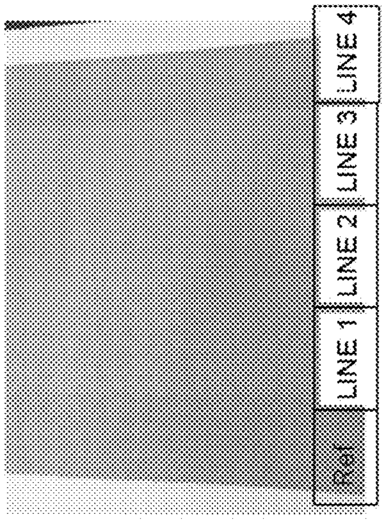
FIGS. 6A to 6B are an explanatory diagram of a side effect of a bow correction.
Figure 6A:
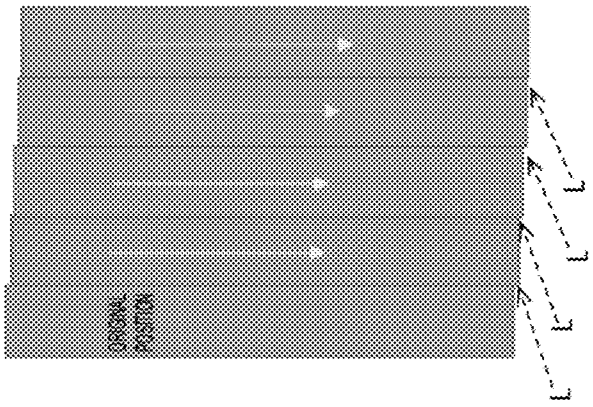

FIGS. 6A to B are a diagram illustrating a side effect of the bow correction.

As illustrated in FIGS. 6A to B, because the processing only involves sliding an image in the sub-scanning direction in segment units, density level differences occur. As illustrated in FIG. 6A, density level differences are generated by only shifting portions of the image downward by one line in the sub-scanning direction (the shift is represented by reference sign L). Note that, as illustrated in FIG. 6B, the density level differences are also generated by registration adjustment in the sub-scanning direction (an example is shown in Ref, line 1, line 2, and subsequent lines).

Figure 7:
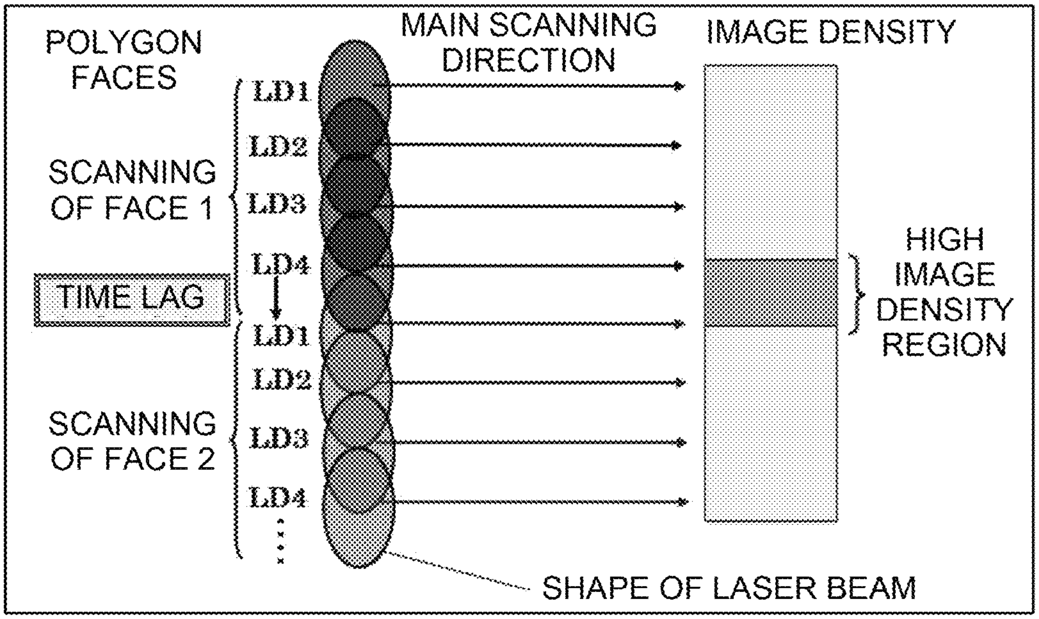
FIG. 7 is a conceptual diagram of a reciprocity failure that describes the cause of a density level difference.

FIG. 7 is an explanatory view illustrating the cause of a density level difference.

In a light emitter employing a multi-beam method having a plurality of laser-emitting elements, a phenomenon referred to as a reciprocity failure, in which an area where the scanning straddles surfaces (surface straddling) becomes dense, causes a change in the distribution that becomes dense in a dither pattern, which causes a density level difference.

For example, FIG. 7 illustrates a schematic diagram of image density unevenness that occurs in a multi-beam scanning system using four channels (LD1 to LD4) of semiconductor lasers. In the example of FIG. 7, the region in which scanning straddles the polygon surfaces of surface 1 and surface 2 in the scanning direction represents a surface straddling.

During scanning, the boundary region between LD1 and LD2 is exposed almost simultaneously. Therefore, an intense light quantity hits the boundary region in a short period of time. On the other hand, in the boundary region between LD4 and LD1, because LD4 is subjected to light exposure first, and then LD1 of a different polygon surface is subjected to light exposure, a time lag (time difference) occurs. Consequently, a small light quantity hits the boundary region over a long period of time. As a result of such a reciprocity failure, the image density in the boundary region between LD4 and LD1 is higher than that in the other parts, resulting in density unevenness (see Hiroyuki Suhara, "Measurement of Electrostatic Latent Images in Electrophotography", July 2015).

Figure 8:
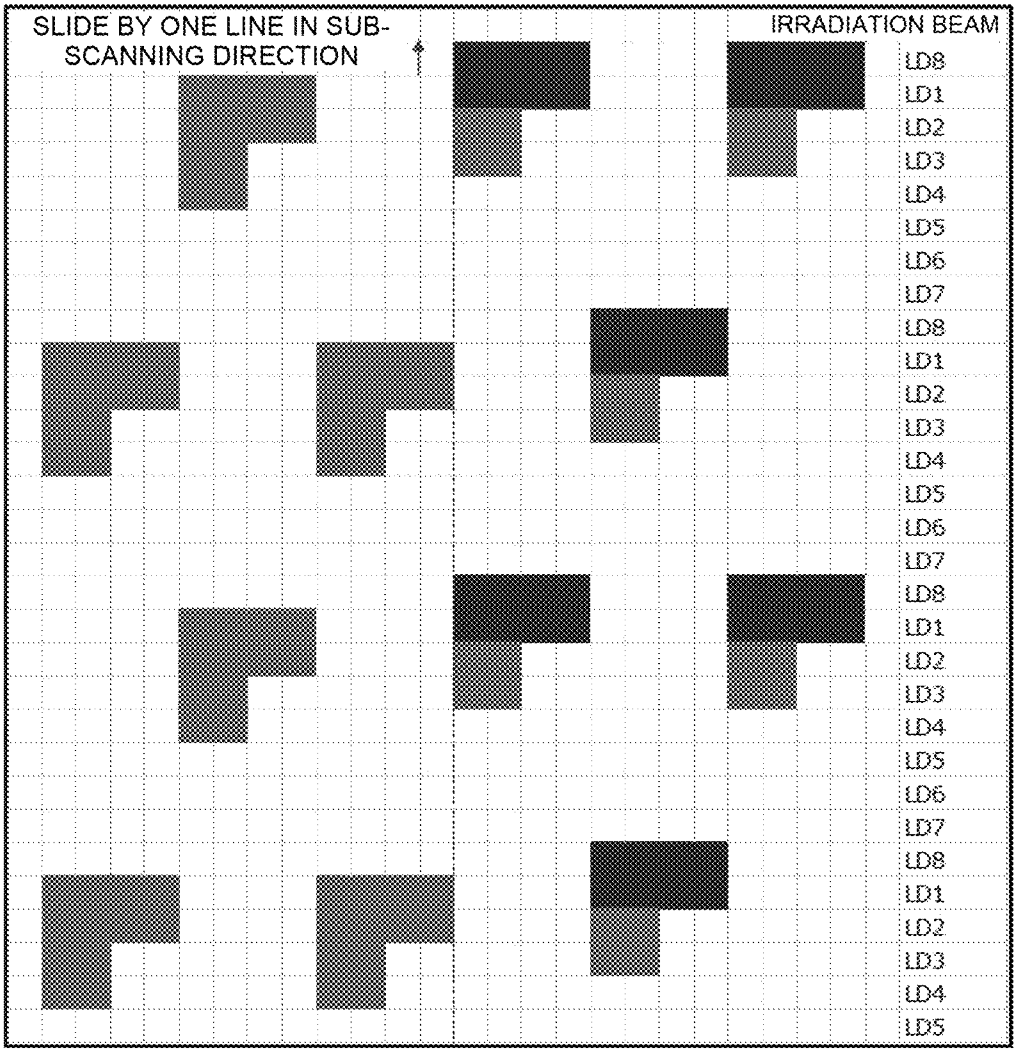
FIG. 8 is a grayscale conceptual diagram that describes the cause of a density level difference.

FIG. 8 shows a micro-level grayscale image of a dither pattern in a multi-beam system that is affected by a reciprocity failure. The light-emitting element has an 8-beam configuration (LD1 to LD8).

It can be seen from FIG. 8 that the image density is higher in the part in which the straddling occurs in the boundary region between LD8 and LD1 than in the other parts, which causes density unevenness.

Here, in FIG. 3 described above, although the processing of each of the bow corrector 230, the light quantity corrector 250, and the shading corrector 300 in FIG. 2 is mainly realized by the laser scanning unit 220*a*, the corresponding specific configurations will be described.

As shown in FIG. 3, in the optical scanning device 200, the laser scanning unit (LSU) 220*a* is controlled by the controller 100.

The reference clock (200*m*) and the BD signal (BD sensor 200*k*) are input to the laser scanning unit 220*a*.

In the laser scanning unit 220*a*, the bow corrector 230 performs an electronic bow correction with respect to the image data according to a control signal from the controller 100. In addition to performing a density correction with respect to an image that has been subjected to electronic bow correction by the bow corrector 230, the light quantity corrector 250 does not set a difference in the light quantity correction value of the plurality of light-emitting elements when the image is in a predetermined image mode such as text/CAD, and sets a difference to a half-tone image in a mode other the predetermined image mode. The shading corrector 300 performs shading correction processing of an image. As a result, the shading corrector 300 creates the shading correction signal Vshade, and the laser driver controller 270 controls the output of the control signals of the laser driver 210 (such as the signals of the bow correction, the density correction by the light quantity correction value, and the shading correction). Based on the control signals output from the laser driver controller 270, the laser driver 210 controls a multi-beam light-emitting operation of the laser emitter 200*a*.

The laser scanning unit 220*a* takes, as inputs, control signals from the controller 100, image data, a horizontal synchronization signal HSYNC, the reference clock signal 200*m*, the detection signals of the beam detection (BD) sensor 200*k*, and the like.

The light quantity corrector 250 calculates a correction value, and inputs the calculated light quantity correction value as a light quantity correction signal to the laser driver 210 to control and correct the multi-beam emission by the laser driver 210.

Light Quantity Correction Processing

Here, the controller 100 (CPU) shown in FIG. 3 causes the laser scanning unit 220*a* to function such that the light quantity corrector 250 in FIG. 2 performs a light quantity correction such that the density level differences in an image that has been subjected to bow correction are resolved, and a difference is set with respect to the light quantity correction of the plurality of laser-emitting elements. In order to control the laser driver 210 according to the light quantity correction set with the difference, the laser scanning unit 220*a* adjusts the gain of the light quantity detector (PD detector) 280 such that the light quantity that is output to the image surface according to Vref differs for each beam of the multi-beam of the emitter 200*a*.

Further, the controller 100 performs a control such that, in a predetermined image mode in which the image has edges, such as text/computer aided design (CAD), a difference is not set (the gain is not adjusted) with respect to the light quantity correction value of the plurality of light-emitting elements, and a difference is set (the gain is adjusted) with respect to a half-tone image in a mode other than the predetermined image mode.

Figure 9A:
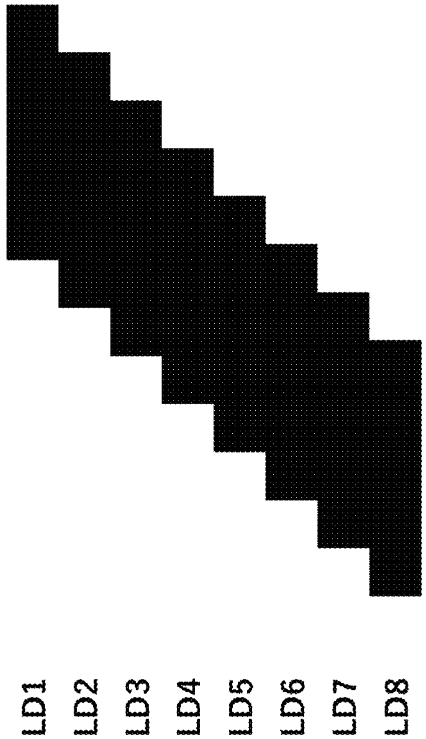
FIGS. 9A to 9B are an explanatory diagram of a case where there is a difference in a set light quantity when an image is in a predetermined image mode such as text/CAD.
Figure 9B:
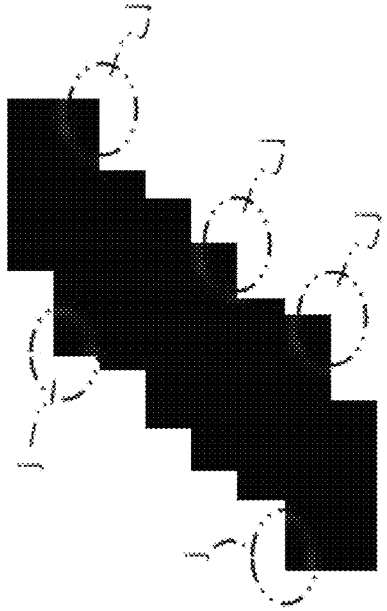

Here, a problem that occurs when the image is in a predetermined image mode such as text/CAD will be described. When the image is in a predetermined image mode such as text/CAD, as shown in FIG. 9A, the jaggies of the diagonal lines become uniform when there is no difference between the set light quantities. In contrast, as shown in FIG. 9B, when there is a difference between the set light quantities, a problem occurs in that the jaggies of the diagonal lines become non-uniform (the surrounding area of the part that has become non-uniform due to setting the difference is indicated by the two-dot chain line sign j).

Therefore, in the embodiment, when the image is not a half-tone image but is an image in a predetermined image mode such as text/CAD, a control is performed so that a difference is not set with respect to the light quantity setting values.

Because images in a predetermined image mode such as text/CAD basically do not contain half-tones, there is no effect of density level differences. In contrast, if a difference is set, the problem of non-uniform jaggies as shown in FIG. 9B will occur. Therefore, it is preferable not to set a difference.

On the other hand, in an image mode other than a predetermined image mode such as text/CAD, because a difference is set with respect to the set light quantity of the plurality of light sources, even if an electronic bow correction is performed, density level differences do not occur in the half-tone image due to the influence of reciprocity failure.

In order to confirm the advantageous effects of the embodiment, in terms of setting the light quantity correction values, FIG. 10A shows light quantity correction values of the conventional technique (JP 5262602 B) compared to a setting example of light quantity correction values of the embodiment shown in FIG. 10B.

The image forming device of the embodiment, which has a configuration in which the light quantity corrector 250 sets a difference with respect to the set light quantity of the plurality of light sources such that density level differences do not occur in a half-tone image due to the influence of reciprocity failure even when a light quantity correction is performed, the controller 100 controls the light quantity correction value of the plurality of light-emitting elements as shown in the setting example of the light quantity correction values in FIG. 10B such that the sign is inverted while the value is made smaller from the light-emitting element on one end side (LD8) toward the light-emitting element on the other end side (LD1) (−12, 10.29, . . . , −1.7, 10.00).

On the other hand, the conventional light quantity correction values shown in FIG. 10A represent a method in which density level differences in a half-tone image are prevented from occurring by inverting the sign of the correction values of the exposure light quantity such that the absolute value of the correction value gradually becomes smaller toward a light source positioned at the center of the plurality of light sources (from ID1 to ID4, values of −6, 4, −2, 0). However, in a predetermined image mode such as text/CAD, as shown in FIG. 9B, a worsening of jaggies occurred, and the performance at a specified resolution could not be sufficiently exhibited.

In other words, in the conventional technique, as shown in FIG. 10A, the two-line total change in the light quantity is large (−2, 2, −2, 0), and it is thought that this is the reason why the density level differences were noticeable. In contrast, in the present embodiment, as shown in FIG. 10B, because the two-line total change in the light quantity becomes smaller (1.72, −1.72), the density level differences can be made less noticeable.

Selection of Laser-Emitting Element for BD Detection

In the embodiment, a control is performed in which BD detection is performed using a beam of a light-emitting element in which the correction value becomes 0 or more. Specifically, it is preferable that BD detection is performed by the BD sensor 200*k* with respect to the beam of a light-emitting element whose correction value is a maximum value.

Because the image surface light quantity in a 2400 dpi, 8-beam configuration is approximately half that of a 1200 dpi, 4-beam configuration, the detected light quantity of the BD sensor 200*k* is also reduced. When the BD detected light quantity becomes small as described above, the number of types of BD sensors capable of performing detection becomes small, and the BD jitter becomes large.

Therefore, in the embodiment, as shown in the seventh laser-emitting element LD7 illustrated by the hatching in FIG. 10B, as a result of performing BD detection using a beam having a large image surface light quantity, the number of types of BD sensors that can be used for detection are ensured, and BD jitter can be reduced.

As described above, the image forming device according to the embodiment provides the following advantageous effects.

[1] In a predetermined image mode having edges, such as in a binary image of text/CAD, the jaggies of the diagonal lines are made uniform, and the performance at the specified resolution can be exhibited.

[2] Because a difference is set with respect to the set light quantity of the plurality of light sources in image modes other than text/CAD, such as a half-tone mode, even if an electronic bow correction is performed, density level differences do not occur in the half-tone image due to the influence of a reciprocity failure.

[3] In a configuration in which a difference is set with respect to the set light quantity of the plurality of light sources, as illustrated in FIGS. 10A to B, the two-line total change in the light quantity becomes smaller, and the density level difference can be made even less noticeable.

[4] As a result of performing BD detection using a beam having a large image surface light quantity, it is possible to ensure the number of types of BD sensors that can be used for detection, and to reduce BD jitter.

Although an embodiment has been described above, specific configurations are not limited to the embodiment, and designs and the like that do not deviate from the gist of the present disclosure are also included in the scope of the claims.

In the embodiment, in the laser emitter 200*a* employing a multi-beam method in which a plurality of laser-emitting elements emit light, the area where a scanning straddling (surface straddling) occurs due to a side effect of a bow correction has the phenomenon that causes the exposure light from the end element to have an increased density due to a reciprocity failure corrected. However, the present embodiment is applicable to cases other than a bow correction where adverse effects of a reciprocity failure occur, such as surface magnification correction, and paper-to-paper registration adjustment.

In addition, in the embodiment, the program that operates in each device in the embodiment is a program that controls a CPU or the like (a program that causes a computer to function) such that the functions of the embodiment described above are realized. Further, the information handled by the devices is temporarily stored in a temporary storage device (such as a RAM) during processing, and then stored in various storage devices, such as a ROM or an HDD, and is read, corrected, and written by the CPU as necessary.

Here, the recording medium that stores the program may be any one of a semiconductor medium (such as a ROM or a non-volatile memory card), an optical recording medium or a magnetooptical recording medium (such as a digital versatile disc (DVD), a magnetooptical disc (MO), a mini disc (MD), a compact disc (CD), or a Blu-ray® disc (BD), and a magnetic recording medium (such as a magnetic tape or a flexible disk).

Furthermore, the functions of the embodiment described above are realized not only by executing a loaded program. The functions of the present disclosure can also be realized by processing in cooperation with an operating system, other application programs, or the like, based on the instructions of the program.

In addition, when a program is distributed to the market, the program can be stored in a portable storage device before distribution, or transferred to a server computer connected via a network such as the Internet. In this case, a storage device of the server computer is obviously also included in the present disclosure.

In addition, some or all of the devices in the embodiment described above may be realized as an LSI (Large Scale Integration), which is typically an integrated circuit. The functional blocks of the devices may be individually formed as a chip, or may be partially or wholly integrated and formed as a chip. Furthermore, the technique of achieving an integrated circuit is not limited to an LSI, and may be realized by a dedicated circuit or by a general-purpose processor. Moreover, when a technology that achieves an integrated circuit that replaces LSI emerges due to advances in semiconductor technology, it will of course be possible to use an integrated circuit based on such a technology.

What is claimed is:

1. An electrophotographic image forming device that scans a surface of an image carrier with a multi-beam emitted from a plurality of light-emitting elements based on image data, the electrophotographic image forming device comprising:

a light quantity corrector that performs a light quantity correction so as to resolve a density level difference in an image, and that sets a different light quantity correction values for the plurality of light-emitting elements; and one or more controllers that, when the image data is in a predetermined image mode, including a text mode or a CAD mode, control the light quantity corrector by not setting a different set light quantities for the plurality of light-emitting elements.

2. The electrophotographic image forming device according to claim 1, further comprising:

a bow corrector that subjects the image data to an electronic bow correction, wherein the light quantity corrector performs a light quantity correction to resolve a density level difference of an image that has been subjected to bow correction at a surface straddling light exposure segment.

3. A control method performed by an electrophotographic image forming device that scans a surface of an image carrier with a multi-beam emitted from a plurality of light-emitting elements based on image data, the method comprising:

performing a light quantity correction to resolve a density level difference in an image, and setting different light quantity correction values for the plurality of light-emitting elements; and controlling, when the image data is in a predetermined image mode, including a text mode or a CAD mode, the light quantity correction by not setting different set light quantities for the plurality of light-emitting elements.

4. The control method according to claim 3, further comprising:

performing a bow correction that subjects image data to an electronic bow correction, wherein the light quantity correction is performed to resolve a density level difference of an image that has been subjected to bow correction at a surface straddling light exposure segment.

* * * * *